(12) United States Patent
Baek et al.

(10) Patent No.: US 12,252,104 B2
(45) Date of Patent: Mar. 18, 2025

(54) ELECTROMECHANICAL BRAKE SYSTEM AND CONTROL METHOD THEREOF

(71) Applicant: HL MANDO CORPORATION, Pyeongtaek-si (KR)

(72) Inventors: Seungtae Baek, Gyeonggi-do (KR); Joonkyu Song, Gyeonggi-do (KR); Kyungho Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 600 days.

(21) Appl. No.: 17/585,545

(22) Filed: Jan. 27, 2022

(65) Prior Publication Data
US 2022/0242384 A1 Aug. 4, 2022

(30) Foreign Application Priority Data
Feb. 2, 2021 (KR) .................. 10-2021-0014899

(51) Int. Cl.
| | |
|---|---|
| *B60T 17/22* | (2006.01) |
| *B60T 13/74* | (2006.01) |
| *F16D 65/18* | (2006.01) |
| *F16D 66/02* | (2006.01) |
| *F16D 65/38* | (2006.01) |
| *F16D 66/00* | (2006.01) |

(Continued)

(52) U.S. Cl.
CPC .......... *B60T 17/221* (2013.01); *B60T 13/746* (2013.01); *F16D 65/18* (2013.01); *F16D 66/026* (2013.01);
(Continued)

(58) Field of Classification Search
CPC .. F16D 2121/24; F16D 65/18; F16D 2125/40; F16D 2065/386; F16D 2066/003;
(Continued)

(56) References Cited

U.S. PATENT DOCUMENTS

| | | | |
|---|---|---|---|
| 6,397,981 B1* | 6/2002 | Tamasho | B60T 13/741 188/71.9 |
| 9,611,908 B2* | 4/2017 | Park | F16D 65/18 |

(Continued)

FOREIGN PATENT DOCUMENTS

| | | |
|---|---|---|
| KR | 10-1745726 | 6/2017 |
| KR | 10-2019-0023381 | 3/2019 |

OTHER PUBLICATIONS

EP 1124073 A2 (Year: 2001).*
(Continued)

*Primary Examiner* — Robert A. Siconolfi
*Assistant Examiner* — Mahbubur Rashid
(74) *Attorney, Agent, or Firm* — WOMBLE BOND DICKINSON (US) LLP

(57) ABSTRACT

Provided is an electromechanical brake system comprising an actuator of an electromechanical brake operated by a motor, the electromechanical brake system including: a motor driving unit configured to drive the motor; and a control unit configured to be electrically connected to the motor driving unit, wherein the control unit is configured to: calculate a first rotation angle of a spindle in a brake apply mode of the electromechanical brake, calculate a second rotation angle of the spindle in a braking release mode of the electromechanical brake, and when a difference between the calculated first rotation angle and the calculated second rotation angle exists, control a notification device to notify a wear state of a brake pad.

12 Claims, 13 Drawing Sheets

(51) Int. Cl.
*F16D 121/24* (2012.01)
*F16D 125/40* (2012.01)

(52) U.S. Cl.
CPC .. *F16D 2065/386* (2013.01); *F16D 2066/003* (2013.01); *F16D 2066/006* (2013.01); *F16D 2121/24* (2013.01); *F16D 2125/40* (2013.01)

(58) Field of Classification Search
CPC ........... F16D 2066/006; F16D 2125/38; F16D 65/56; F16D 66/00; F16D 66/026; F16D 65/66; F16D 66/02; F16D 65/38; F16D 65/46; F16D 65/54; B60T 13/741; B60T 13/746; B60T 17/221; B60T 13/748; B60T 8/17

See application file for complete search history.

(56) References Cited

U.S. PATENT DOCUMENTS

| | | | | |
|---|---|---|---|---|
| 10,138,964 | B2* | 11/2018 | Lee | F16D 55/226 |
| 10,167,914 | B2* | 1/2019 | Hyun | F16D 55/226 |
| 10,337,575 | B2* | 7/2019 | Lee | F16D 65/66 |
| 10,427,661 | B2* | 10/2019 | Masuda | B60T 13/662 |
| 2008/0059023 | A1* | 3/2008 | Ueno | B60T 13/746 188/1.11 E |
| 2009/0218179 | A1* | 9/2009 | Yokoyama | F16D 65/18 188/1.11 L |
| 2012/0018262 | A1* | 1/2012 | Winkler | F16D 65/18 188/106 F |
| 2015/0027820 | A1* | 1/2015 | Park | F16D 65/0068 188/72.1 |
| 2017/0009830 | A1* | 1/2017 | Masuda | F16D 55/226 |
| 2017/0321773 | A1* | 11/2017 | Lee | F16D 65/18 |
| 2018/0163803 | A1* | 6/2018 | Lee | F16D 65/18 |
| 2021/0301889 | A1* | 9/2021 | Gerber | B60T 13/746 |

OTHER PUBLICATIONS

CN 103909918 B (Year: 2018).*
WO 2020193420 A1 (Year: 2020).*
DE 102016219842 A1 (Year: 2017).*

* cited by examiner

[FIG. 1]
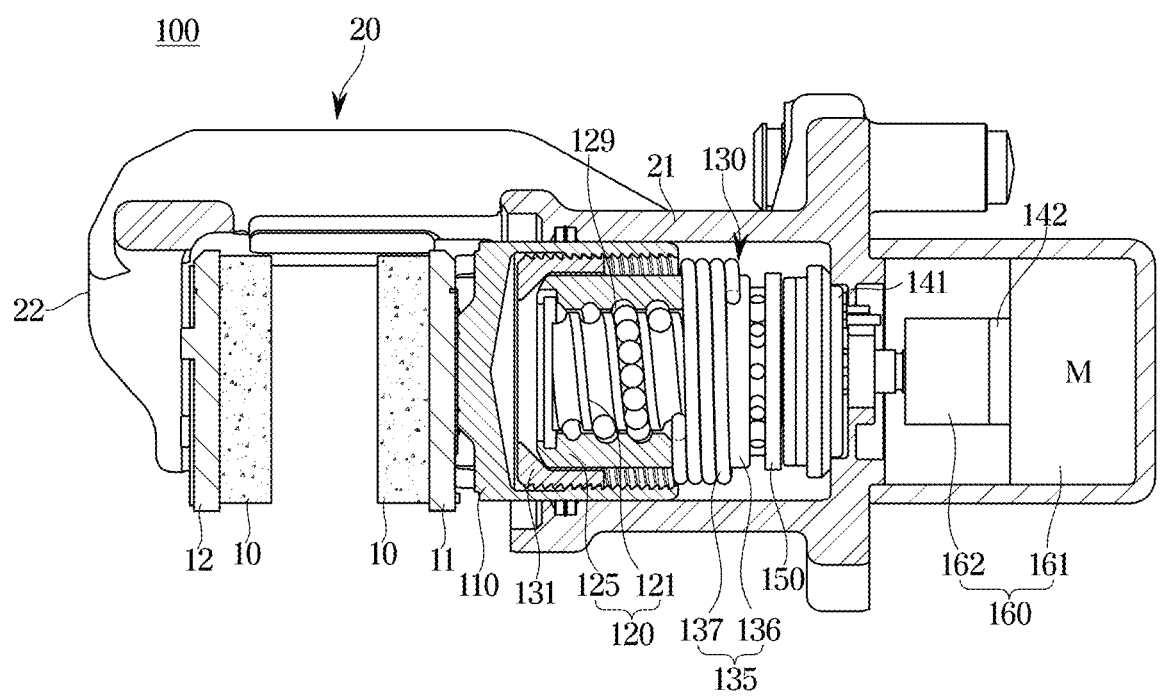

[FIG. 2]
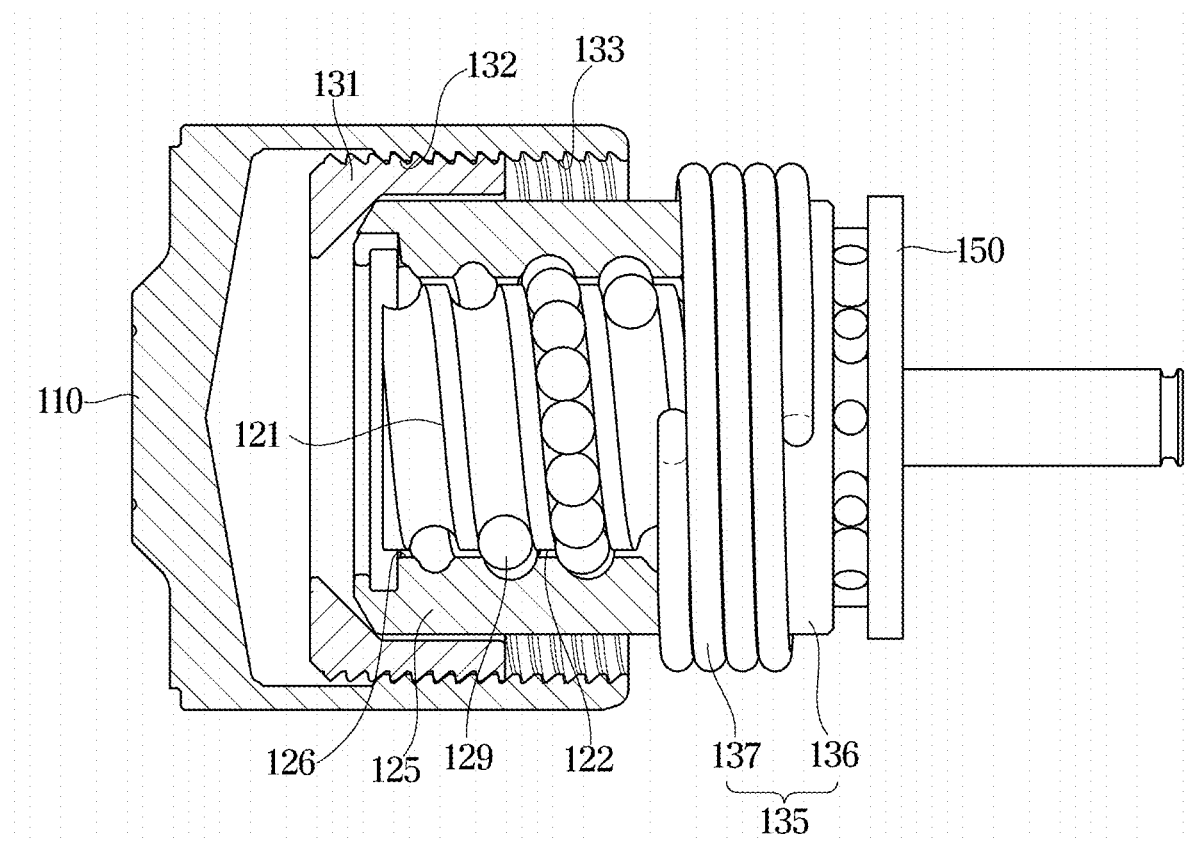

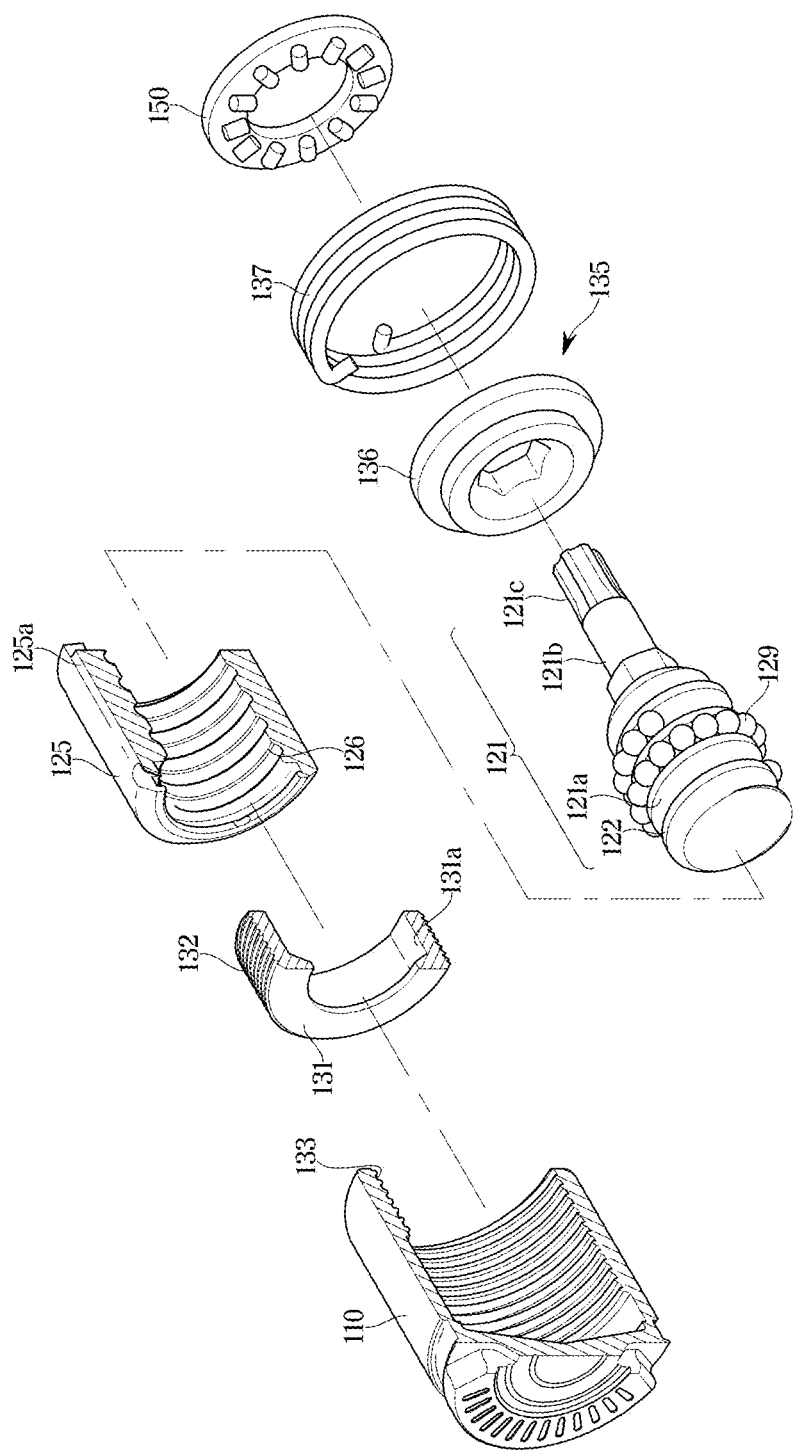
[FIG. 3]

[FIG. 4]
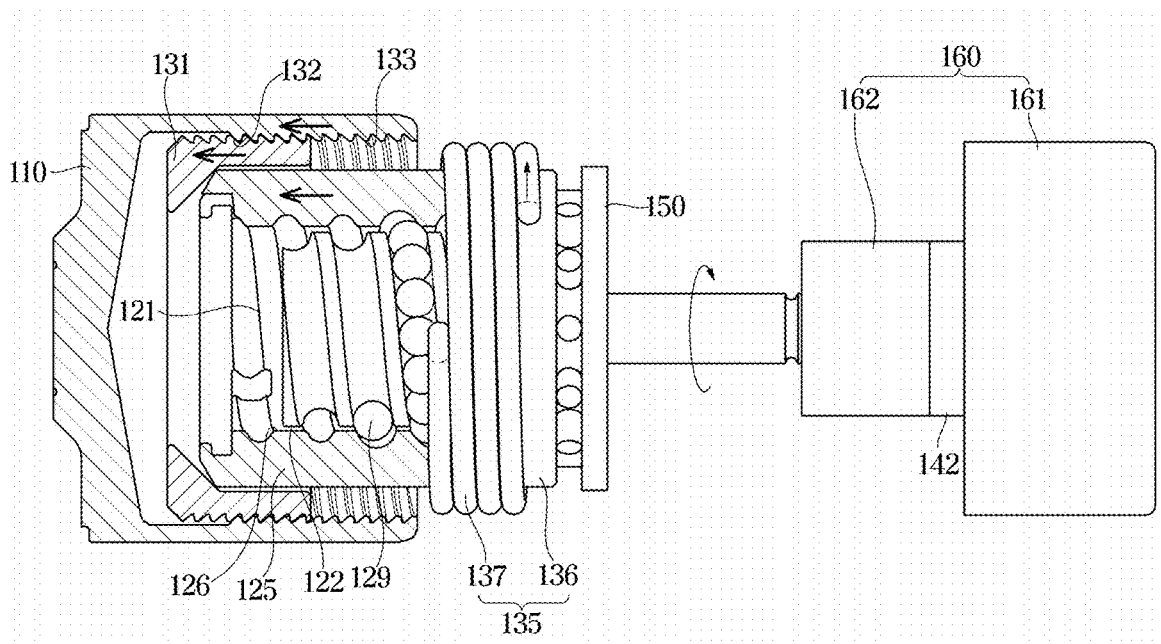

[FIG. 5]
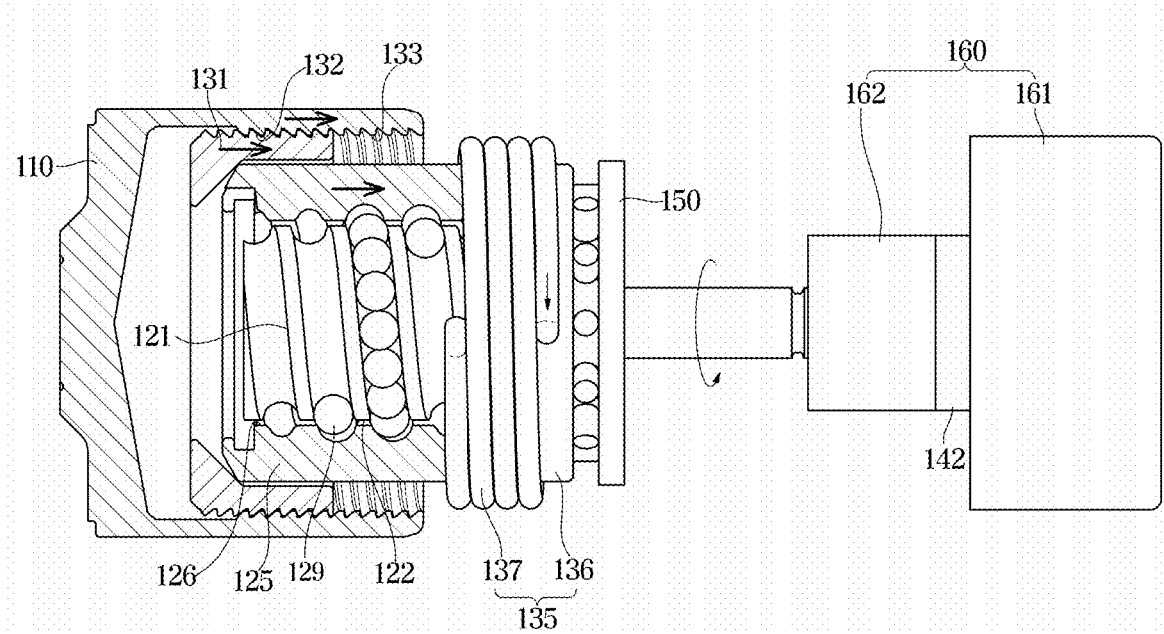

[FIG. 6]
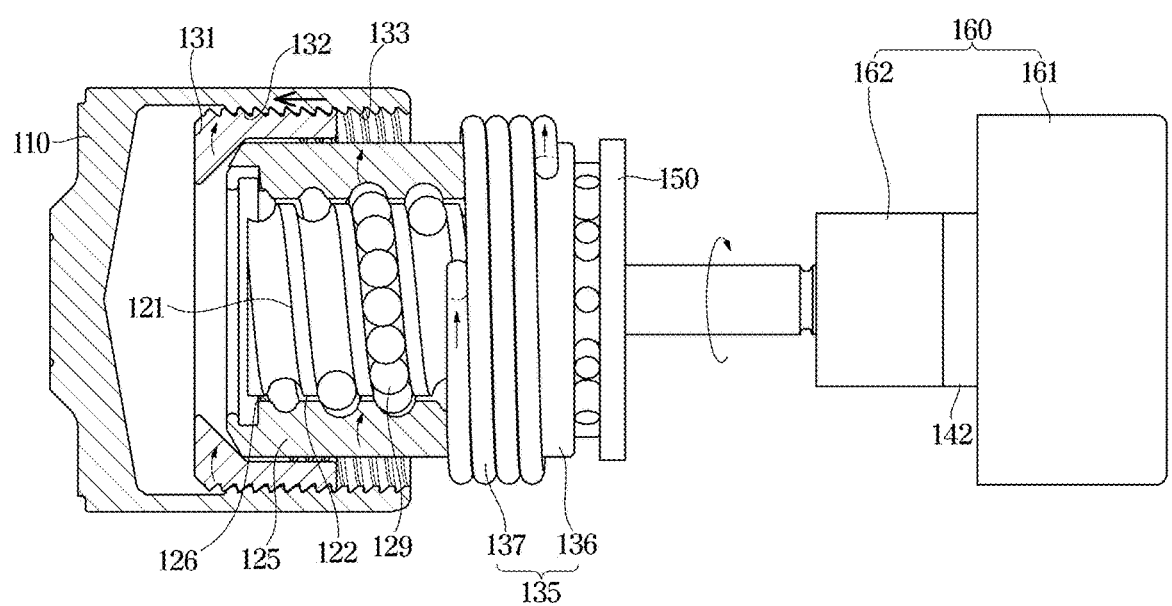

[FIG. 7]
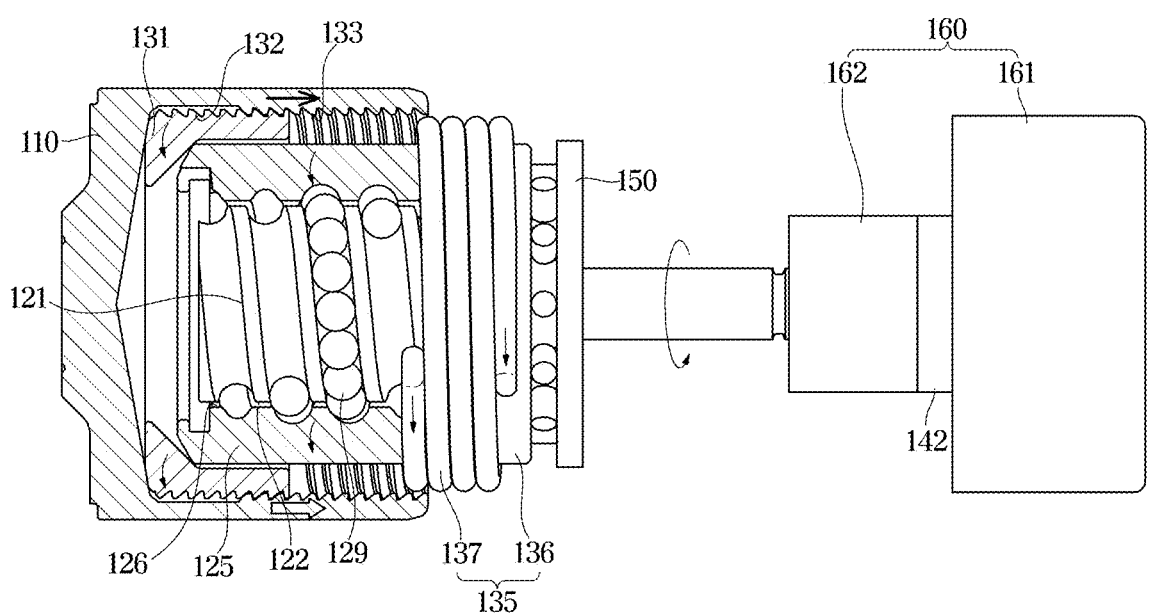

[FIG. 8]
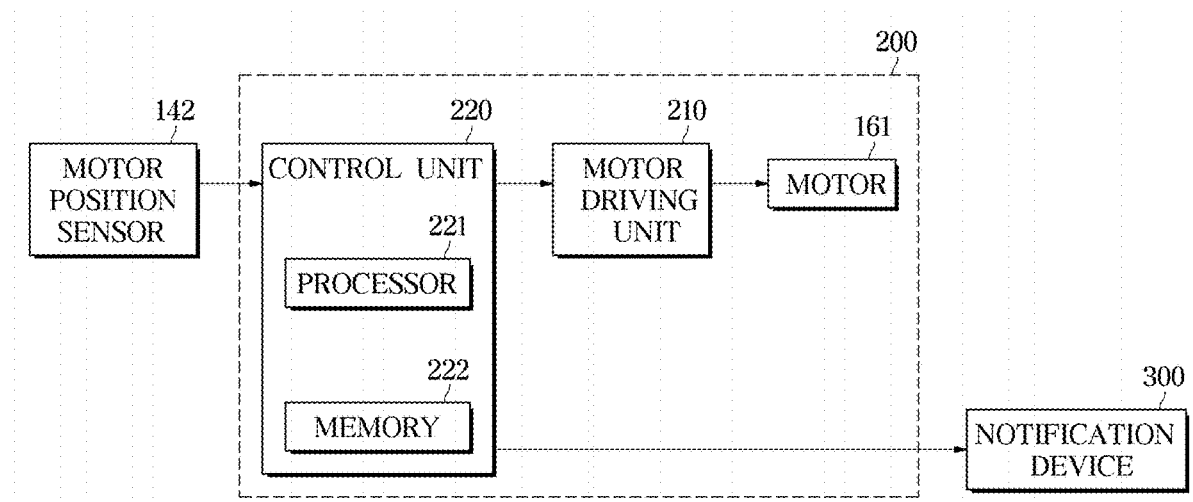

[FIG. 9]

|  | FIRST BRAKING | SECOND BRAKING | THIRD BRAKING | FOURTH BRAKING | ... |
|---|---|---|---|---|---|
| FIRST ROTATION ANGLE OF SPINDLE (A) | 40 | 55 | 30 | 57 | ... |
| SECOND ROTATION ANGLE OF SPINDLE (B) | -40 | -50 | -30 | -50 | ... |
| DIFFERENCE IN ROTATION ANGLE (C) | - | 5 | - | 7 | ... |
| ADJUSTMENT STROKE VALUE OF PISTON (D) | 0 | 0.11 | 0 | 0.16 | ... |

[FIG. 10]
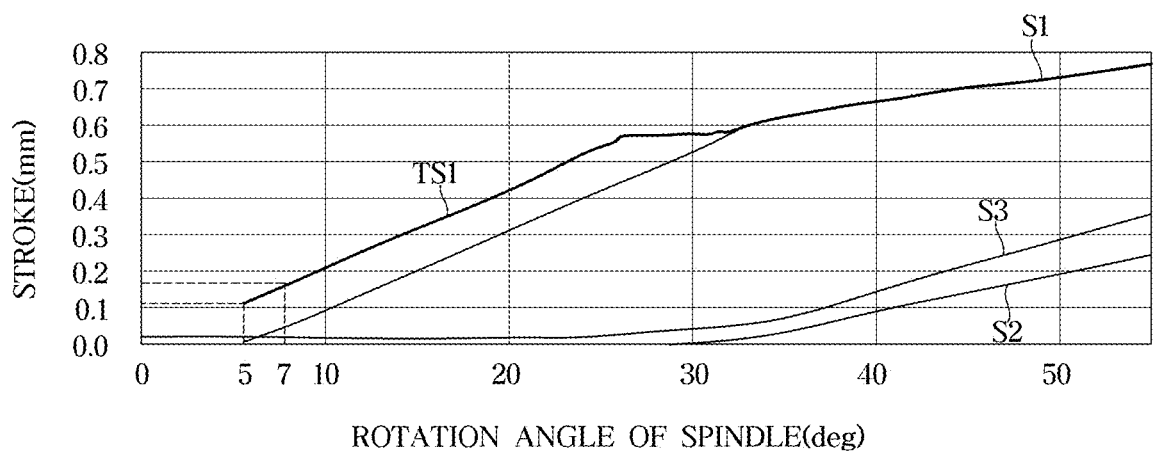

[FIG. 11]
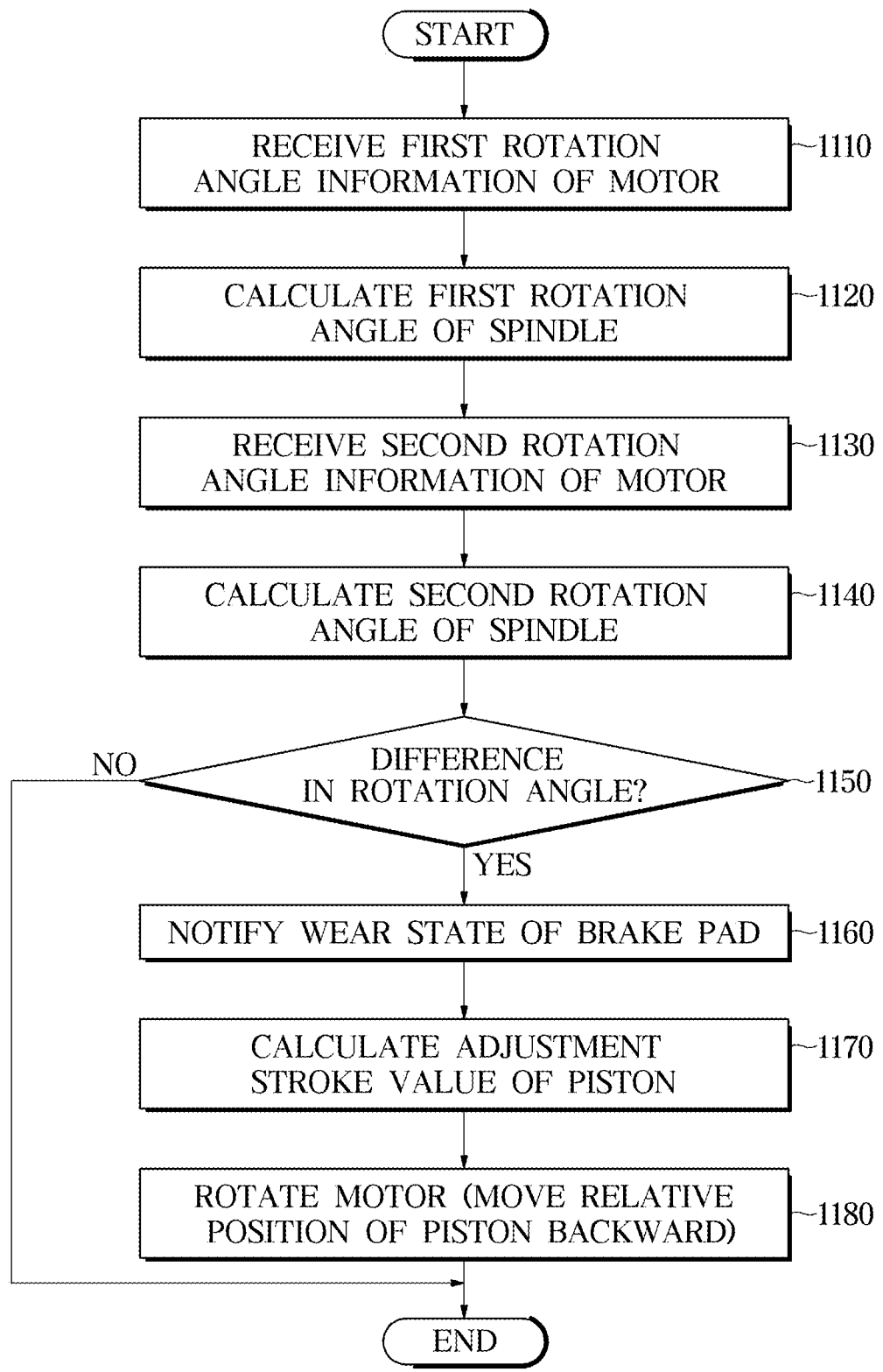

[FIG. 12]
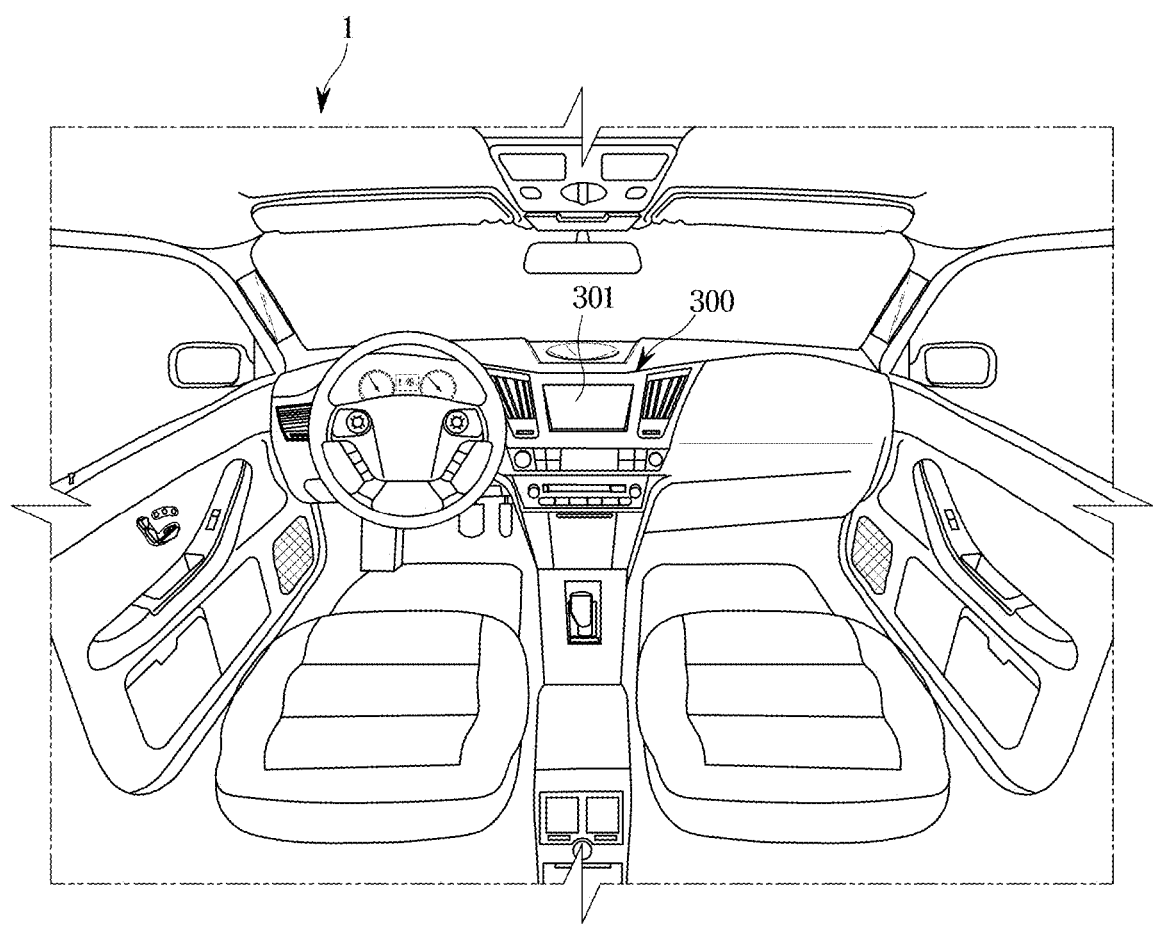

[FIG. 13]
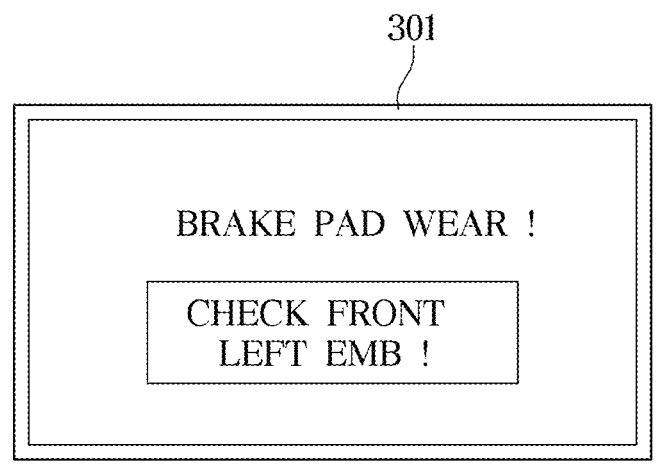

ELECTROMECHANICAL BRAKE SYSTEM AND CONTROL METHOD THEREOF

CROSS-REFERENCE TO RELATED APPLICATION

This application is based on and claims priority under 35 U.S.C. § 119 to Korean Patent Application No. 10-2021-0014899, filed on Feb. 2, 2021 in the Korean Intellectual Property Office, the disclosure of which is incorporated herein by reference.

BACKGROUND

1. Technical Field

The disclosure relates to an electromechanical brake system and a control method thereof that may notify a driver of a brake pad wear state in real time.

2. Background Art

A brake system for performing braking is essential to a vehicle, and various types of brake systems have been proposed for the safety of drivers and passengers.

A conventional brake system that supplies hydraulic pressure required for braking to wheel cylinders using a mechanically connected booster when a driver depresses a brake pedal has been mainly used. Recently, however, as a next generation brake system, an electromechanical brake system that receives a depressing force from the driver as an electric signal and operates an electric device such as a motor based on the electric signal to provide a braking force to a vehicle have been developed.

Such an electromechanical brake system converts a rotational force of a motor into a linear motion through the motor, a speed reducer, and the like to provide a clamping force to a brake disc, thereby performing a service brake and a parking brake of a vehicle.

In a conventional electromechanical brake system, however, brake pads are gradually worn down due to repeated braking and braking release operations.

Accordingly, a conventional electromechanical brake system may not check and recognize a wear state of brake pads, causing an accident during braking.

SUMMARY

An aspect of the disclosure provides an electromechanical brake system and control method thereof that may notify a driver of a brake pad wear state in real time.

Additional aspects of the disclosure will be set forth in part in the description which follows and, in part, will be obvious from the description, or may be learned by practice of the disclosure.

According to an aspect of the disclosure, an electromechanical brake system including an actuator of an electromechanical brake operated by a motor, the electromechanical brake system including: a motor driving unit configured to drive the motor; and a control unit configured to be electrically connected to the motor driving unit, wherein the control unit is configured to: calculate a first rotation angle of a spindle rotated by driving the motor in a brake apply mode of the electromechanical brake, calculate a second rotation angle of the spindle in a braking release mode of the electromechanical brake, and when a difference between the calculated first rotation angle and the calculated second rotation angle exists, control a notification device to notify a wear state of a brake pad.

The control unit is configured to: receive first rotation angle information of the motor acquired by a motor position sensor in the brake apply mode, calculate the first rotation angle of the spindle based on the received first rotation angle information of the motor, receive second rotation angle information of the motor acquired by the motor position sensor in the braking release mode, and calculate the second rotation angle of the spindle based on the received second rotation angle information of the motor.

The brake apply mode includes at least one of a mode for performing a braking operation of the electromechanical brake or a mode for performing a compensation braking operation for brake pad wear of the electromechanical brake.

The braking release mode includes at least one of a mode for performing a braking release operation of the electromechanical brake or a mode for performing a compensation braking release operation for a drag phenomenon of the electromechanical brake.

The control unit is configured to control the notification device to notify a wear state of a brake pad of a corresponding electromechanical brake among a front electromechanical brake and a rear electromechanical brake.

The notification device is a center fascia located between a driver's seat and a front passenger seat.

When the difference between the calculated first rotation angle and the calculated second rotation angle exists, the control unit is configured to further calculate an adjustment stroke value of a piston corresponding to the difference in rotation angle, and further control the motor driving unit to rotate the motor to advance a relative position of the piston in response to the calculated adjustment stroke value of the piston.

According to another aspect of the disclosure, a control method of an electromechanical brake system including an actuator of an electromechanical brake operated by a motor, the control method including: calculating a first rotation angle of a spindle rotated by driving the motor in a brake apply mode of the electromechanical brake, calculating a second rotation angle of the spindle in a braking release mode of the electromechanical brake, and when a difference between the calculated first rotation angle and the calculated second rotation angle exists, notifying a wear state of a brake pad.

The calculating of the first rotation angle of the spindle receives first rotation angle information of the motor acquired by a motor position sensor in the brake apply mode, and calculates the first rotation angle of the spindle based on the received first rotation angle information of the motor.

The calculating of the second rotation angle of the spindle receives second rotation angle information of the motor acquired by the motor position sensor in the braking release mode, and calculates the second rotation angle of the spindle based on the received second rotation angle information of the motor.

The notifying of the wear state of the brake pad notifies a wear state of a brake pad of a corresponding electromechanical brake among a front electromechanical brake and a rear electromechanical brake.

The control method of the electromechanical brake system further including: when the difference between the calculated first rotation angle and the calculated second rotation angle exists, further calculating an adjustment stroke value of a piston corresponding to the difference in rotation angle, and rotating the motor to advance a relative position of the piston in response to the calculated adjustment stroke value of the piston.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of an electromechanical brake included in an electromechanical brake system according to an embodiment of the disclosure;

FIG. 2 illustrates an enlarged cross-sectional view of a main part of an electromechanical brake included in an electromechanical brake system according to an embodiment of the disclosure;

FIG. 3 illustrates an exploded view of a main part of an electromechanical brake included in an electromechanical brake system according to an embodiment of the disclosure;

FIG. 4 illustrates a braking operation of an electromechanical brake included in an electromechanical brake system according to an embodiment of the disclosure;

FIG. 5 illustrates a braking release operation of an electromechanical brake included in an electromechanical brake system according to an embodiment of the disclosure;

FIG. 6 illustrates a compensation braking operation for brake pad wear of an electromechanical brake included in an electromechanical brake system according to an embodiment of the disclosure;

FIG. 7 illustrates a compensation braking release operation for a drag phenomenon of an electromechanical brake included in an electromechanical brake system according to an embodiment of the disclosure;

FIG. 8 illustrates a configuration of an electromechanical brake system according to an embodiment of the disclosure;

FIG. 9 illustrates a calculation of an adjustment stroke value of a piston corresponding to a difference of a rotation angle of a spindle in an electromechanical brake system according to an embodiment of the disclosure;

FIG. 10 illustrates a process of calculating an adjustment stroke value of a piston required depending on a difference of a rotation angle of a spindle in an electromechanical brake system according to an embodiment of the disclosure;

FIG. 11 illustrates a control method of an electromechanical brake system according to an embodiment of the disclosure;

FIG. 12 illustrates a center fascia installed in a vehicle where an electromechanical brake system according to an embodiment of the disclosure is applied; and FIG. 13 illustrates a notification of a brake pad wear state of a front left electromechanical brake through a display panel in a center fascia of a vehicle where an electromechanical brake system according to an embodiment of the disclosure is applied.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 illustrates a configuration of an electromechanical brake included in an electromechanical brake system according to an embodiment of the disclosure.

Referring to FIG. 1, according to an embodiment of the disclosure, an electromechanical brake 100 may include a carrier (not shown) on which a pair of pad plates 11 and 12 are installed to press a brake disc (not shown) rotating together with a wheel of a vehicle, a caliper housing 20 slidably installed on the carrier to operate the pair of pad plates 11 and 12, a piston 110 installed in the caliper housing 20 to move forward, an actuator 160 provided to generate and provide a rotational driving force for moving the piston 110, a power conversion unit 120 provided to convert the rotational driving force provided by the actuator 160 into a linear motion and transmit the linear motion to the piston 110 so that the piston 110 moves forward in an axial direction, a position adjuster 130 provided to compensate for wear of a brake pad 10 or to reduce a drag phenomenon by adjusting a relative position of the piston 110 with respect to the power conversion unit 120, and a sensor 140 provided to measure a close contact force between the brake disc (not shown) and the brake pad 10 or a clamping force of the brake pad 10. The brake pad 10 may be attached to an inner surface of each of the pair of pad plates 11 and 12. The pair of pad plates 11 and 12 include the inner pad plate 11 disposed to be in contact with the piston 110 and an outer pad plate 12 disposed to be in contact with a finger part 22 of the caliper housing 20, which will be described later, and may be slidably installed on the carrier.

The caliper housing 20 includes the finger part 22 for operating the outer pad plate 12 and a cylinder 21 in which the piston 110 is installed, and may be fastened to the carrier to be slidably movable. As the caliper housing 20 slides from the carrier to move toward the brake disc (not shown) by a reaction force caused by the movement of the piston 110 when the vehicle is braked, the outer pad plate 12 may approach the brake disc (not shown) by the finger part 22 to press the brake disc (not shown).

FIG. 2 illustrates an enlarged cross-sectional view of a main part of an electromechanical brake included in an electromechanical brake system according to an embodiment of the disclosure. FIG. 3 illustrates an exploded view of a main part of an electromechanical brake included in an electromechanical brake system according to an embodiment of the disclosure.

Referring to FIGS. 1 to 3, the piston 110 may be provided in a cup shape in which a rear side is open, and be slidably inserted inside the cylinder 21. Also, the piston 110 may receive power through the actuator 160 and the power conversion unit 120 to be described later, and press the inner pad plate 11 toward the brake disc (not shown). A second screw thread 133, which is engaged with a first screw thread 132 formed on an outer circumferential surface of an adjusting screw 131 to be described later, may be formed on an inner circumferential surface of the piston 110. The power conversion unit 120 includes a spindle 121, a nut 125 and a plurality of balls 129. The spindle 121 is provided to rotate by receiving a driving force from the actuator 160, and the nut 125 is disposed inside the piston 110 and screwed to the spindle 121 to move forward together with the piston 110 by rotation of the spindle 121 in a first direction or move backward together with the piston 110 by rotation of the spindle 121 in a second direction. The plurality of balls 129 are interposed between the spindle 121 and the nut 125. The power conversion unit 120 as described above may be provided as a ball-screw type converter for converting a rotational motion of the spindle 121 into a linear motion.

Hereinafter, the rotation of the spindle 121 in the first direction refers to a rotation direction of moving the nut 125 forward by the rotation of the spindle 121, and the rotation of the spindle 121 in the second direction opposite to the first direction refers to a rotation direction of moving the nut 125 backward by the rotation of the spindle 121.

The spindle 121 may include a first end 121a of one side in which an external thread 122 is formed on an outer circumferential surface, a second end 121c of the other side connected to the actuator 160 to receive a driving force, and a central portion 121b disposed between the first end 121a and the second end 121c to which a flange 136 to be described later is fixed. The first end 121a of the spindle 121 may be inserted into the nut 125. A bearing 150 for smooth rotation of the flange 136 to be described later, and the sensor 140 for measuring a fastening force between the brake disc (not shown) and the brake pad 10 by detecting a load applied to the spindle 121 may be disposed on the second end 121c.

The nut 125 may be formed in a hollow cylindrical shape such that the first end 121a of the spindle 121 is inserted therein, and an internal thread 126 that is engaged with the external thread 122 of the spindle 121 through the balls 129 may be formed on an inner circumferential surface of the nut 125. Also, the adjusting screw 131 to be described later may be provided on an outside of the nut 125 to surround at least a portion of the an outer circumferential surface of the nut 125, and a rotation preventing surface 125a in which at least a portion thereof is formed as a flat surface may be provided on the outer circumferential surface of the nut 125 to prevent relative rotation with the adjusting screw 131. Because the ball-screw type power conversion unit is a well-known technology that is already widely applied, a detailed description of its operation will be omitted.

The actuator 160 may include a motor 161 and a reduction device 162 having a plurality of reduction gears and may receive power from a power supply device disposed in the vehicle to generate and provide a driving force. The actuator 160 may be connected to the second end 121c of the spindle 121 to transmit the generated driving force to the spindle 121, thereby rotating the spindle 121. The actuator 160 may be installed in an outside of the caliper housing 20, and the reduction device 162 may be provided in various structures such as a planetary gear assembly and a worm structure to reduce the power of the motor 161 and provide the reduced power to the spindle 121.

The position adjuster 130 is provided to move the relative position of the piston 110 forward in order to compensate for wear of the brake pad 10 by adjusting the relative position of the piston 110 with respect to the power conversion unit 120, or to move the relative position of the piston 110 backward in order to reduce the drag phenomenon.

The position adjuster 130 may include the adjusting screw 131, the first screw thread 132, the second screw thread 133, and an adjuster 135. The adjusting screw 131 is provided on the outside of the nut 125 to rotate together with the nut 125, the first screw thread 132 is formed on the outer circumferential surface of the adjusting screw 131 and the second screw thread 133 is formed on the inner circumferential surface of the piston 110 to be engaged with the first screw thread 132. The adjuster 135 is provided between the spindle 121 and the nut 125 to compress or expand depending on a rotation amount of the spindle 121 to move the relative position of the piston 110 forward by rotating the nut 125 and the adjusting screw 131 in the first direction or to move the relative position of the piston 110 backward by rotating the nut 125 and the adjusting screw 131 in the second direction opposite to the first direction.

The rotation in the first direction of the nut 125 or the adjusting screw 131, which will be described below, is the same as the rotation in the first direction of the spindle 121 described above, and refers to rotation in a direction of moving the piston 110 forward by the rotation of the adjusting screw 131. Also, the rotation in the second direction of the nut 125 or the adjusting screw 131, which is a rotation in a direction opposite to the first direction, is the same as the rotation in the second direction of the spindle 121 described above, and refers to rotation in a direction of moving the piston 110 backward by the rotation of the adjusting screw 131.

The adjusting screw 131 is provided to surround a front portion of the nut 125, and the first screw thread 132 is formed on the outer circumferential surface thereof. A rotation preventing surface 131a in which at least a portion of an inner circumferential surface in contact with the nut 125 is formed as a flat surface may be formed on the adjusting screw 131 to prevent relative rotation while rotating together with the nut 125. When the nut 125 is rotated by the adjuster 135 to be described later, the adjusting screw 131 may transmit a rotational force of the nut 125 to the piston 110 while rotating together with the nut 125. As the adjusting screw 131 is provided to be interposed between the nut 125 and the piston 110, the adjusting screw 131 may absorb a load generated when the nut 125 and the piston 110 come into contact with each other, so that deformation and wear of components such as the nut 125 and the piston 110 to which a large load is applied may be prevented.

The first screw thread 132 may be formed on the outer circumferential surface of the adjusting screw 131, the second screw thread 133 may be formed on the inner circumferential surface of the piston 110, and the first screw thread 132 and the second screw thread 133 are provided to be engaged with each other. As such, because the adjusting screw 131 and the piston 110 that rotate and linearly move together with the nut 125 are screw-coupled to each other, the nut 125, the adjusting screw 131, and the piston 110 may linearly move together, so that the nut 125, the adjusting screw 131, and the piston 110 may move forward together during braking of a general vehicle or may move backward together during braking release of the general vehicle. At the same time, as the adjusting screw 131 and the piston 110 may rotate relative to each other, the piston 110 may move forward relative to the nut 125 or the spindle 121 by the rotation of the nut 125 and the adjusting screw 131 in the first direction, and the piston 110 may move backward relative to the nut 125 or the spindle 121 by the rotation of the nut 125 and the adjusting screw 131 in the second direction opposite to the first direction.

The adjuster 135 may generate rotation of the nut 125 and the adjusting screw 131 to move the relative position of the piston 110 with respect to the nut 125 or the spindle 121 forward or backward. The adjuster 135 may include the flange 136 and a torsion spring 137. The flange 136 is fixed to the central portion 121b of the spindle 121 and formed to expand in a radial direction. The torsion spring 137 is provided between the nut 125 and the flange 136 to elastically support the nut 125 with respect to the flange 136 and induces rotation of the nut 125 and the adjusting screw 131 in the first or second direction by compressing or expanding in its original form when the spindle 121 or the flange 136 exceeds a predetermined rotation angle.

The flange 136 is formed at the central portion 121b of the spindle 121 to extend in the radial direction and fixed to the spindle 121 to rotate integrally with the spindle 121. The bearing 150 for facilitating smooth rotation of the flange 136 and preventing wear between the flange 136 and surrounding components may be provided on a rear surface of the flange 136.

The torsion spring 137 may be provided such that one end thereof is inserted into and fixed to the outer circumferential surface of the nut 125 and the other end thereof is inserted into and fixed to the flange 136. Within a predetermined rotation angle, for example, within a rotation angle of the spindle 121 between a braking release state and a braking state of the vehicle, the torsion spring 137 maintains its compressed or expanded state. However, when exceeding the predetermined rotation angle, the torsion spring 137 may be compressed or expanded to restore to its original shape, thereby inducing rotation of the nut 125 and the adjusting screw 131 in the first direction or the second direction.

Specifically, in a state before the brake is operated or a state of being switched from the braking release state to the braking state of the vehicle, an elastic restoring force by the rotation angle of the spindle 121 in the first direction may be provided to be less than a screw fastening force between the adjusting screw 131 and the piston 110. Accordingly, in braking of a general vehicle, even when the spindle 121 and the flange 136 rotate in the first direction, the torsion spring 137 maintains its compressed state, so that the relative position of the piston 110 with respect to the nut 125 or the spindle 121 may be constantly maintained.

In order for the electromechanical brake 100 to perform a compensation braking operation for wear of the brake pad 10, when a rotation angle of the spindle 121 in the first direction for braking the vehicle exceeds the predetermined rotation angle, the elastic restoring force of the torsion spring 137 becomes larger than the screw fastening force between the adjusting screw 131 and the piston 110. Accordingly, the torsion spring 137 is expanded to return to its original shape, the nut 125 and the adjusting screw 131 may rotate in the first direction due to the expansion of the torsion spring 137, and thus the relative position of the piston 110 with respect to the nut 125 or the spindle 121 may be moved forward.

In order for the electromechanical brake 100 to perform a compensation braking operation for the drag phenomenon, when a rotation angle of the spindle 121 in the second direction for releasing of braking of the vehicle exceeds the predetermined rotation angle, the elastic restoring force of the torsion spring 137 becomes larger than the screw fastening force between the adjusting screw 131 and the piston 110. Accordingly, the torsion spring 137 is compressed to return to its original shape, the nut 125 and the adjusting screw 131 may rotate in the second direction due to the compression of the torsion spring 137, and thus the relative position of the piston 110 with respect to the nut 125 or the spindle 121 may be moved backward.

A force sensor 141 may be provided to measure a close contact force or a clamping force between the brake disc (not shown) and the brake pad 10. The force sensor 141 may detect a load of the spindle 121 or the actuator 160 to measure the clamping force between the brake disc (not shown) and the brake pad 10. The force sensor 141 may transmit clamping force information between the brake disc (not shown) and the brake pad 10 to a control unit 220.

A motor position sensor 142 may be provided to measure a rotation angle of the motor 161. The motor position sensor 142 may measure a first rotation angle of the motor 161 when a brake apply mode is on, and measure a second rotation angle of the motor 161 when a braking release mode is on. The brake apply mode may include at least one of a mode for performing a braking operation of the electromechanical brake 100 or a mode for performing a compensation braking operation for brake pad wear of the electromechanical brake 100. The braking release mode may include at least one of a mode for performing a braking release operation of the electromechanical brake 100 or a mode for performing a compensation braking release operation for drag phenomenon of the electromechanical brake 100. The motor position sensor 142 may transmit first rotation angle information and second rotation angle information of the motor 161 to the control unit 220.

FIG. 4 illustrates a braking operation of an electromechanical brake included in an electromechanical brake system according to an embodiment of the disclosure.

Referring to FIG. 4, the electromechanical brake 100 rotates the spindle 121 in the first direction using the actuator 160, thereby moving the nut 125 forward to press the piston 110. The piston 110 pressed by the movement of the nut 125 presses the inner pad plate 11, and thus the brake pad 10 comes into close contact with the brake disc (not shown) to perform a braking operation that generates a clamping force.

In this instance, the torsion spring 137 is compressed by the rotation of the spindle 121 in the first direction. However, because an elastic restoring force of the torsion spring 137 generated by a predetermined rotation angle in the first direction from a braking release state to a braking state of a vehicle is smaller than a screw fastening force between the adjusting screw 131 and the piston 110, a rotation of the nut 125 and the adjusting screw 131 does not occur in a general braking operation. Accordingly, a relative position of the piston 110 with respect to the nut 125 or the spindle 121 may be constantly maintained.

FIG. 5 illustrates a braking release operation of an electromechanical brake included in an electromechanical brake system according to an embodiment of the disclosure.

Referring to FIG. 5, the electromechanical brake 100 rotates the spindle 121 in the second direction using the actuator 160, thereby moving the nut 125 pressed by the piston 110 backward. The pressure on the piston 110 by the backward movement of the nut 125 is released, and thus the brake pad 10 is spaced apart from the brake disc (not shown), thereby performing a braking release operation that releases the generated clamping force.

In this instance, a rotation angle of the spindle 121 in the second direction corresponds to a rotation angle of the spindle 121 in the first direction in a general braking operation, and thus the torsion spring 137 may return to its original shape by the rotation of the spindle 121 in the second direction.

FIG. 6 illustrates a compensation braking operation for brake pad wear of an electromechanical brake included in an electromechanical brake system according to an embodiment of the disclosure.

Referring to FIG. 6, the electromechanical brake 100 rotates the spindle 121 in excess of a predetermined rotation angle in the first direction using the actuator 160, thereby rotating the nut 125 and the adjusting screw 131 to further press the piston 110. Accordingly, the piston 110, further pressed by the rotation of the nut 125 and the adjusting screw 131, further presses the inner pad plate 11, and thus the brake pad 10 further comes into close contact with the brake disc (not shown) to perform a compensation braking operation for wear of the brake pad 10.

In this instance, the spindle 121 additionally rotates in the first direction, thereby further compressing the torsion spring 137 more than a general braking operation. Accordingly, because an elastic restoring force of the torsion spring 137 is greater than a screw fastening force between the adjusting screw 131 and the piston 110, the torsion spring 137 expands to restore its original shape, thereby rotating the nut 125 and the adjusting screw 131 in the first direction. Accordingly, a relative position of the piston 110 with respect to the nut 125 or the spindle 121 may be moved forward in order to compensate for wear of the brake pad 10.

FIG. 7 illustrates a compensation braking release operation for a drag phenomenon of an electromechanical brake included in an electromechanical brake system according to an embodiment of the disclosure.

Referring to FIG. 7, the electromechanical brake 100 rotates the spindle 121 in excess of a predetermined rotation angle in the second direction using the actuator 160, thereby rotating the nut 125 and the adjusting screw 131 to further release the pressure on the piston 110. Accordingly, the piston 110, further released by the rotation of the nut 125 and the adjusting screw 131, is further spaced apart from the inner pad plate 11, and thus a compensation braking release operation for a drag phenomenon of the brake pad 10 may be performed.

In this instance, the spindle 121 additionally rotates in the second direction, thereby further expanding the torsion spring 137 more than a general braking release operation. Accordingly, because an elastic restoring force of the torsion spring 137 is greater than a screw fastening force between the adjusting screw 131 and the piston 110, the torsion spring 137 is compressed to restore its original shape, thereby rotating the nut 125 and the adjusting screw 131 in the second direction. Accordingly, a relative position of the piston 110 with respect to the nut 125 or the spindle 121 may be moved backward, and thus the drag where the piston 110 is not returned to its original position may be reduced.

According to an embodiment, the electromechanical brake system may calculate a first rotation angle and a second rotation angle of the spindle based on first rotation angle information and second rotation angle information acquired by the motor position sensor, and when a difference between the calculated first rotation angle and the calculated second rotation angle exists, notify a driver of a brake pad wear state in real time to induce replacement of the brake pad.

FIG. 8 illustrates a configuration of an electromechanical brake system according to an embodiment of the disclosure.

Referring to FIG. 8, an electromechanical brake system 200 may include the motor 161, a motor driving unit 210, and the control unit 220.

The control unit 220 may receive brake pedal information through a brake pedal position sensor and from another system performing a control unit area network (CAN) communication which is in-vehicle network. For example, the control unit 220 may receive the brake pedal information from an anti-lock braking system (ABS) or a traction control system (TCS). The brake pedal information may be a brake pedal operation signal by a driver's pedal operation in which a driver presses a brake pedal. The control unit 220 may receive clamping force information between the brake pad 10 and the brake disc (not shown) from the force sensor 141.

The control unit 220 may drive the motor 161 by a braking signal generated by the driver's pedal operation. The control unit 220 may perform a brake apply mode or a braking release mode according to the braking signal generated by the driver's pedal operation.

The motor driving unit 210 may drive the motor 161. The motor driving unit 210 may drive the motor 161 in a first direction or a second direction. When driving the motor 161 in the first direction, the electromechanical brake 100 may perform a braking operation, and when driving the motor 161 in the second direction, the electromechanical brake 100 may perform a braking release operation. The motor driving unit 210 may generate a motor current for driving the motor 161 in the first direction or the second direction and apply the motor current to the motor 161. For example, the motor driving unit 210 may include an H-bridge circuit including a plurality of power switching devices to drive the motor 161 in the first direction or the second direction.

The control unit 220 may include a processor 221 and a memory 222.

The processor 221 may calculate a first rotation angle of the spindle 121 in the brake apply mode of the electromechanical brake 100. The processor 221 may receive first rotation angle information of the motor 161 acquired by the motor position sensor 142 in the brake apply mode, and calculate the first rotation angle of the spindle 121 based on the received first rotation angle information of the motor 161. When the motor 161 rotates in the first direction, the processor 221 may determine that the electromechanical brake 100 is in the brake apply mode, and calculate the first rotation angle of the spindle 121 based on the received first rotation angle information of the motor 161. The brake apply mode may include at least one of a mode for performing a braking operation of the electromechanical brake 100 or a mode for performing a compensation braking operation for brake pad wear of the electromechanical brake 100.

The processor 221 may calculate a second rotation angle of the spindle 121 in the braking release mode of the electromechanical brake 100. The processor 221 may receive second rotation angle information of the motor 161 acquired by the motor position sensor 142 in the braking release mode, and calculate the second rotation angle of the spindle 121 based on the received second rotation angle information of the motor 161. When the motor 161 rotates in the second direction, the processor 221 may determine that the electromechanical brake 100 is in the braking release mode, and calculate the second rotation angle of the spindle 121 based on the received second rotation angle information of the motor 161. The braking release mode may include at least one of a mode for performing a braking release operation of the electromechanical brake 100 or a mode for performing a compensation braking release operation for a drag phenomenon of the electromechanical brake 100.

When a difference between the calculated first rotation angle and the calculated second rotation angle of the spindle 121 exists, the processor 221 may control a notification device 300 to notify a wear state of the brake pad 10. The notification device 300 may notify a wear state of the brake pad 10 of a corresponding electromechanical brake among a front electromechanical brake and a rear electromechanical brake. For example, the notification device 300 may notify a wear state of the brake pad 10 with respect to a front left electromechanical brake, a front right electromechanical brake, a rear left electromechanical brake and a rear right electromechanical brake, and the like.

When the difference between the calculated first rotation angle and the calculated second rotation angle of the spindle 121 exists, the processor 221 may further calculate an adjustment stroke value of the piston 110 corresponding to a difference in rotation angle.

FIG. 9 illustrates calculation of an adjustment stroke value of a piston corresponding to a difference of a rotation angle of a spindle in an electromechanical brake system according to an embodiment of the disclosure.

Referring to FIG. 9, when a difference between a calculated first rotation angle A of the spindle 121 in a brake apply mode and a calculated second rotation angle B of the spindle 121 in a braking release mode exists, the processor 221 may calculate an adjustment stroke value D of the piston corresponding to a difference C in rotation angle.

As an experimental example, the electromechanical brake 100 may respectively perform a braking operation and a braking release operation in a first braking state, a second braking state, a third braking state and a fourth braking state, according to a driver's pedal operation. The processor 221 may calculate the difference C in rotation angle with respect to the first to fourth braking states, and the adjustment stroke value D of the piston corresponding to the difference C in rotation angle. For example, the processor 221 may determine that the differences C in rotation angle with respect to the second braking state and the fourth braking state are "5" and "7", respectively, and calculate the adjustment stroke values D of the piston corresponding to "5" and "7", as "0.11" and "0.16". In this instance, the processor 221 may determine that the brake pad 10 is in a worn state when performing the braking operation and braking release operation in the second braking state and the fourth braking state.

FIG. 10 illustrates a process of calculating an adjustment stroke value of a piston required depending on a difference of a rotation angle of a spindle in an electromechanical brake system according to an embodiment of the disclosure.

Referring to FIG. 10, when a difference between a calculated first rotation angle of the spindle 121 in a brake apply mode and a calculated second rotation angle of the spindle 121 in a braking release mode exists, the processor 221 may calculate an adjustment stroke value of the piston required depending on the difference in rotation angle of the spindle. In this instance, TS1 is an adjustment stroke value of the piston in a braking release direction required depending on the difference in rotation angle. When the difference in rotation angle is "5", the adjustment stroke value of the piston in the braking release direction may be output as "0.11", and when the difference in rotation angle is "7", the adjustment stroke value of the piston in the braking release direction may be output as "0.16". Meanwhile, S1 is a stroke value of the piston in a braking direction, S2 is a stroke value of an adjuster, and S3 is a stroke value of a nut.

The processor 221 may further control the motor driving unit 210 to rotate the motor 161 in order to move a relative position of the piston 110 forward in response to the calculated adjustment stroke value of the piston 110. For example, the processor 221 may control the motor driving unit 210 in response to "0.11" and "0.16" which are the adjustment stroke values D of the piston.

The processor 221 may include a digital signal processor for processing first rotation angle information and second rotation angle information of the motor 161, and a micro control unit (MCU) for generating a notification signal to notify a wear state of the brake pad 10.

The memory 222 may store a program and/or data for the processor 221 to process the first rotation angle information and the second rotation angle information of the motor 161, and a program and/or data for the processor 221 to generate the notification signal to notify the wear state of the brake pad 10.

The memory 222 may temporarily store the first rotation angle information and the second rotation angle information of the motor 161 and temporarily store processing results of the first rotation angle information and the second rotation angle information of the motor 161 by the processor 221.

The memory 222 may include a volatile memory such as a static random access memory (S-RAM) and dynamic random access memory (D-RAM), and a non-volatile memory such as a flash memory, a read only memory (ROM), an erasable programmable read only memory (EPROM), and the like.

FIG. 11 illustrates a control method of an electromechanical brake system according to an embodiment of the disclosure.

Referring to FIG. 11, the control unit 220 may receive first rotation angle information of the motor 161 acquired by the motor position sensor 142 in a brake apply mode of the electromechanical brake 100 according to a driver's pedal operation (1110). The control unit 220 may calculate a first rotation angle of the spindle 121 based on the received first rotation angle information of the motor 161 (1120). When the motor 161 rotates in a first direction, the control unit 220 may determine that the electromechanical brake 100 is in the brake apply mode. The brake apply mode may include at least one of a mode for performing a braking operation of the electromechanical brake 100 or a mode for performing a compensation braking operation for brake pad wear of the electromechanical brake 100.

The control unit 220 may receive second rotation angle information of the motor 161 acquired by the motor position sensor 142 in a braking release mode of the electromechanical brake 100 (1130). The control unit 220 may calculate a second rotation angle of the spindle 121 based on the received second rotation angle information of the motor 161 (1140). When the motor 161 rotates in s second direction, the control unit 220 may determine that the electromechanical brake 100 is in the braking release mode. The braking release mode may include at least one of a mode for performing a braking release operation of the electromechanical brake 100 or a mode for performing a compensation braking release operation for a drag phenomenon of the electromechanical brake 100.

The control unit 220 may determine whether a difference between the calculated first rotation angle of the spindle 121 and the calculated second rotation angle of the spindle 121 exists (1150). When the difference between the calculated first rotation angle of the spindle 121 and the calculated second rotation angle of the spindle 121 exists, the control unit 220 may determine that the brake pad 10 is in a worn state.

When the difference between the calculated first rotation angle of the spindle 121 and the calculated second rotation angle of the spindle 121 exists, the control unit 220 may control the notification device 300 to notify a wear state of the brake pad 10 (1160).

FIG. 12 illustrates a center fascia installed in a vehicle where an electromechanical brake system according to an embodiment of the disclosure is applied.

Referring to FIG. 12, the notification device 300 is located in a dashboard provided between a driver's seat and a front passenger seat of a vehicle 1, and may be a center fascia in which a display panel 301 of an audio/video/navigation (AVN) device that displays a brake pad wear state or outputs a sound and an image is installed. The notification device 300 may notify a wear state of a brake pad of a corresponding electromechanical brake among a front electromechanical brake and a rear electromechanical brake. The notification device 300 is not limited to that illustrated in FIG. 12, and may display the brake pad wear state through an instrument panel or a separate terminal, and through a head-up display (HUD) provided in a driver's window side.

FIG. 13 illustrates a notification of a brake pad wear state of a front left electromechanical brake through a display panel in a center fascia of a vehicle where an electromechanical brake system according to an embodiment of the disclosure is applied.

Referring to FIG. 13, the notification device 300 may notify a brake pad wear state of a front left electromechanical brake through the display panel 301. However, the notification device 300 is not limited to that illustrated in FIG. 13, and may notify a brake pad wear state with respect to a front right electromechanical brake, a rear left electromechanical brake and a rear right electromechanical brake, and the like.

Meanwhile, as a result of the determination in operation 1150, when the difference between the calculated first rotation angle of the spindle 121 and the calculated second rotation angle of the spindle 121 does not exist, the control unit 220 may control the notification device 300 not to notify the wear state of the brake pad 10.

When the difference between the calculated first rotation angle of the spindle 121 and the calculated second rotation angle of the spindle 121 exists, the control unit 220 may further calculate an adjustment stroke value of the piston 110 corresponding to the difference in rotation angle (1170). The control unit 220 may calculate the difference C in rotation angle with respect to the first braking state, the second braking state, the third braking state and the fourth braking state, and the adjustment stroke value D of the piston corresponding to the difference C in rotation angle. For example, the control unit 220 may determine that the differences C in rotation angle with respect to the second braking state and the fourth braking state are "5" and "7", respectively, and calculate the adjustment stroke values D of the piston corresponding to "5" and "7", as "0.11" and "0.16".

The control unit 220 may further control the motor driving unit 210 to rotate the motor 161 in order to advance a relative position of the piston 110 in response to the calculated adjustment stroke value of the piston 110 (1180). For example, the control unit 220 may control the motor driving unit 210 in response to "0.11" and "0.16" which are the adjustment stroke values D of the piston. The motor 161 may generate a rotational force in a braking release direction in response to the calculated adjustment stroke values of the piston 110.

In a conventional electromechanical brake system, a brake pad wear state is detected using an electronic brake pad wear sensor or a mechanical brake pad wear sensor.

As described above, the electromechanical brake system 200 according to an embodiment of the disclosure may calculate the first rotation angle and the second rotation angle of the spindle 121 based on the first rotation angle information and the second rotation angle information of the motor 161 acquired by the motor position sensor 142, without using an electronic brake pad wear sensor or a mechanical brake pad wear sensor, and when a difference between the calculated first rotation angle and the calculated second rotation angle exists, may notify a driver of a wear state of the brake pad 10 in real time through the notification device 300.

As is apparent from the above, according to the embodiments of the disclosure, the electromechanical brake system and the control method thereof can notify a driver of a brake pad wear state in real time.

What is claimed is:

1. An electromechanical brake system comprising an actuator of an electromechanical brake operated by a motor, the electromechanical brake system comprising:
a motor driving unit configured to drive the motor; and
a control unit configured to be electrically connected to the motor driving unit,
wherein the control unit is configured to:
calculate a first rotation angle of a spindle rotated by driving the motor in a brake apply mode of the electromechanical brake,
calculate a second rotation angle of the spindle in a braking release mode of the electromechanical brake, and
when a difference between the calculated first rotation angle and the calculated second rotation angle exists, control a notification device to notify a wear state of a brake pad.

2. The electromechanical brake system of claim 1, wherein the control unit is configured to:
receive first rotation angle information of the motor acquired by a motor position sensor in the brake apply mode,
calculate the first rotation angle of the spindle based on the received first rotation angle information of the motor,
receive second rotation angle information of the motor acquired by the motor position sensor in the braking release mode, and
calculate the second rotation angle of the spindle based on the received second rotation angle information of the motor.

3. The electromechanical brake system of claim 1, wherein the brake apply mode comprises at least one of a mode for performing a braking operation of the electromechanical brake or a mode for compensating for brake pad wear of the electromechanical brake.

4. The electromechanical brake system of claim 1, wherein the braking release mode comprises at least one of a mode for performing a braking release operation of the electromechanical brake or a mode for compensating for a drag phenomenon of the electromechanical brake.

5. The electromechanical brake system of claim 1, wherein:
each of a front electromechanical brake and a rear electromechanical brake included in a vehicle comprises the electromechanical brake, and
the control unit is configured to control the notification device to notify a wear state of a brake pad of a corresponding electromechanical brake among the front electromechanical brake and the rear electromechanical brake.

6. The electromechanical brake system of claim 1, wherein the notification device is a center fascia located between a driver's seat and a front passenger seat.

7. The electromechanical brake system of claim 1, wherein, when the difference between the calculated first rotation angle of the spindle and the calculated second rotation angle of the spindle exists, the control unit is configured to further calculate an adjustment stroke value of a piston corresponding to the difference in rotation angle, and
further control the motor driving unit to rotate the motor to advance a relative position of the piston in response to the calculated adjustment stroke value of the piston.

8. A control method of an electromechanical brake system comprising an actuator of an electromechanical brake operated by a motor, the control method comprising:
calculating a first rotation angle of a spindle rotated by driving the motor in a brake apply mode of the electromechanical brake,
calculating a second rotation angle of the spindle in a braking release mode of the electromechanical brake, and
when a difference between the calculated first rotation angle and the calculated second rotation angle exists, notifying a wear state of a brake pad.

9. The control method of the electromechanical brake system of claim 8, wherein the calculating of the first rotation angle of the spindle receives first rotation angle information of the motor acquired by a motor position sensor in the brake apply mode, and calculates the first rotation angle of the spindle based on the received first rotation angle information of the motor.

10. The control method of the electromechanical brake system of claim 8, wherein the calculating of the second rotation angle of the spindle receives second rotation angle information of the motor acquired by the motor position sensor in the braking release mode, and calculates the second rotation angle of the spindle based on the received second rotation angle information of the motor.

11. The control method of the electromechanical brake system of claim 8, wherein:
each of a front electromechanical brake and a rear electromechanical brake included in a vehicle comprises the electromechanical brake, and
the notifying of the wear state of the brake pad notifies a wear state of a brake pad of a corresponding electromechanical brake among the front electromechanical brake and the rear electromechanical brake.

12. The control method of the electromechanical brake system of claim 8, further comprising:
when the difference between the calculated first rotation angle of the spindle and the calculated second rotation angle of the spindle exists, further calculating an adjustment stroke value of a piston corresponding to the difference in rotation angle, and
rotating the motor to advance a relative position of the piston in response to the calculated adjustment stroke value of the piston.

* * * * *